United States Patent
Lin et al.

(10) Patent No.: US 10,839,606 B2
(45) Date of Patent: Nov. 17, 2020

(54) INDOOR SCENE STRUCTURAL ESTIMATION SYSTEM AND ESTIMATION METHOD THEREOF BASED ON DEEP LEARNING NETWORK

(71) Applicant: NATIONAL TSING HUA UNIVERSITY, Hsinchu (TW)

(72) Inventors: Hung-Jin Lin, Taichung (TW); Shang-Hong Lai, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/235,783

(22) Filed: Dec. 28, 2018

(65) Prior Publication Data
US 2020/0211284 A1 Jul. 2, 2020

(51) Int. Cl.
*G06T 19/00* (2011.01)
*G06N 3/08* (2006.01)
*G06K 9/00* (2006.01)

(52) U.S. Cl.
CPC ........ *G06T 19/006* (2013.01); *G06K 9/00691* (2013.01); *G06N 3/08* (2013.01)

(58) Field of Classification Search
None
See application file for complete search history.

(56) References Cited

U.S. PATENT DOCUMENTS

2018/0137642 A1* 5/2018 Malisiewicz ........ G06K 9/6271
2018/0268220 A1* 9/2018 Lee .................... G06K 9/6256

FOREIGN PATENT DOCUMENTS

CN 106952338 A 9/2016
CN 106952338 A 7/2017

OTHER PUBLICATIONS

Yang, Fengting, and Zihan Zhou. "Recovering 3d planes from a single image via convolutional neural networks." Proceedings of the European Conference on Computer Vision (ECCV). 2018. (Year: 2018).*
Hung Jin Lin, et al., "Indoor Scene Layout Estimation from a Single Image", 2018 24th International Conference on Pattern Recognition (ICPR) Beijing, China, Aug. 20-24, 2018, pp. 842-847.

* cited by examiner

*Primary Examiner* — Nurun N Flora
(74) *Attorney, Agent, or Firm* — Muncy, Geissler, Olds & Lowe, P.C.

(57) ABSTRACT

An indoor scene structural estimation system and an estimation method based on deep learning network are provided. An indoor scene structural estimation system based on deep learning network includes a 2D encoder, a 2D plane decoder, a 2D edge decoder, a 2D corner decoder, and a 3D encoder. The 2D encoder receives an input image and encodes the input image. The 2D plane decoder is connected to the 2D encoder, decodes the encoded input image, and generates a 2D plane segment layout image. The 2D plane decoder is connected to the 2D encoder, decodes the encoded input image, and generates a 2D plane segment layout image. The 2D corner decoder is connected to 2D encoder, decodes the encoded input image, and generates a 2D corner layout image.

8 Claims, 14 Drawing Sheets
(8 of 14 Drawing Sheet(s) Filed in Color)

INDOOR SCENE STRUCTURAL ESTIMATION SYSTEM AND ESTIMATION METHOD THEREOF BASED ON DEEP LEARNING NETWORK

BACKGROUND OF THE INVENTION

1. Field of the Invention

The present disclosure relates to an indoor scene structural estimation system and an estimation method thereof, and more particularly to an indoor scene structural estimation system and an estimation method thereof based on deep learning network that performs training and practices by using a neural network.

2. Description of the Related Art

Generally, for conventional deep learning methods, both additional processes or optimal methods are required to complete the final input when outputting a 2D indoor scene, resulting in an increase in the amount of operations and an impact on the efficiency of the operation.

On the other hand, conventional deep learning methods cannot be used to estimate an indoor 3D scene, let alone output an indoor 3D scene directly through the neural network. Thus, the estimation and output of the 3D indoor scene are critical issues that the related industries may encounter and need to solve.

SUMMARY OF THE INVENTION

In view of the aforementioned problems, the present disclosure provides an indoor scene structural estimation system and an estimation method thereof based on deep learning network to solve the problems that may be encountered in prior art.

On the basis of the aforementioned purpose, the present disclosure provides the indoor scene structural estimation system based on deep learning network, including a 2D encoder, a 2D plane decoder, a 2D edge decoder, a 2D corner decoder, and a 3D encoder. The 2D encoder receives an input image and encodes the input image. The 2D plane decoder is connected to the 2D encoder, decodes the encoded input image, and generates a 2D plane segment layout image. The 2D plane decoder is connected to the 2D encoder, decodes the encoded input image, and generates a 2D plane segment layout image. The 2D corner decoder is connected to 2D encoder, decodes the encoded input image, and generates a 2D corner layout image. The 3D encoder is connected to the 2D plane decoder, the 2D edge decoder, and the 2D corner decoder, receives the 2D plane segment layout image, the 2D edge layout image, and the 2D corner layout image, encodes the 2D plane segment layout image, the 2D edge layout image, and the 2D corner layout image to generate a 3D parameter, and generates a 3D indoor scene image according to the 3D parameter.

Preferably, the 3D encoder includes a first training phase and a second training phase. In the first training phase, a virtual 3D parameter and a template cube are generated by a random abstraction layer generator. The template cube is inputted to the 2D encoder for encoding. The 2D edge decoder decodes the encoded template cube to generate the 2D edge layout image. A pre-trained 3D encoder encodes the 2D edge layout image to generate a training 3D parameter. When the training 3D parameter and the virtual 3D parameter are identical, the first training phase ends. In the second training phase, an actual training image is inputted to the 2D encoder, and the 2D edge decoder decodes the encoded actual training image to generate the 2D edge layout image. The 2D edge layout image is inputted to the pre-trained 3D encoder and encoded to generate the training 3D parameter, and the 2D edge layout image is inputted to a target 3D encoder and encoded to generate a target 3D parameter. When the error of the target 3D parameter and the training 3D parameter is less than a preset threshold value, the second training phase ends and the target 3D encoder acts as the 3D encoder.

Preferably, the 2D plane segment layout image, the 2D edge layout image, and the 2D corner layout image are processed using a loss function, and the loss function is presented as follows:

$$\text{Loss} = \mathcal{L}_{plane} + \mathcal{L}_{edge} + \mathcal{L}_{corner}$$

$$\mathcal{L}_{plane} = \mathcal{L}_{seg} + \lambda_s \mathcal{L}_{smooth}$$

$$\mathcal{L}_{smooth} = \text{mean}(|x_i - target_i|_1)$$

Wherein, Loss is a loss function, $L_{place}$ is a plane loss function. $L_{edge}$ is an edge loss function. $L_{corner}$ is a corner loss function. $L_{seg}$ is a segment loss function. $L_{smooth}$ is a smooth loss function, $\lambda_s$ is the weight for smoothness term, $x_i$ is the predicted output, and $target_i$ is the ground truth label.

Preferably, the input picture is provided by a camera, the camera has a camera intrinsic matrix, and a projected image of the 3D indoor scene image conforms to the following equation:

$$X_{2D} \equiv \pi(X_{3D} \mid K, P, \text{scale})$$

$$K = \begin{bmatrix} f_x & 0 & c_x \\ 0 & f_y & c_y \\ 0 & 0 & 1 \end{bmatrix}$$

$$P = [R \mid T] \in \mathbb{R}^{3 \times 4}$$

Wherein, $X_{2D}$ is a projected image. $\pi$ refers to projection. $X_{3D}$ is a 3D indoor scene image. K is a camera intrinsic matrix of the camera. scale is a side-length ratio of a cube formed by an indoor scene where the camera is located. $f_x$ and $f_y$ are focal length coordinates of the camera. $c_x$ and $c_y$ are central point coordinates of the camera. R is a 3×3 rotation matrix. T is a 3×1 translation vector. P is a projection matrix.

Preferably, the 3D parameter includes a triaxial Euler rotation angle, a triaxial length ratio of the cube corresponding to the 3D indoor scene image, and the camera location of a camera outputting the output image.

On the basis of the purpose as mentioned above, the present disclosure further provides an indoor scene structural estimation method based on deep learning network applicable to including a 2D encoder, a 2D plane decoder, a 2D edge decoder, a 2D corner decoder, and 3D encoder. The indoor scene structural estimation method based on deep learning network includes the following steps: receiving an input image and encoding the input image; decoding the encoded input image and generating a 2D plane segment layout image, a 2D edge layout image, and a 2D corner layout image; encoding the 2D plane segment layout image, the 2D edge layout image, and the 2D corner layout image to generate a 3D parameter; and generating a 3D indoor scene image according to the 3D parameter.

Preferably, the 3D encoder may include a first training phase and a second training phase. The indoor scene structural estimation method based on deep learning network further includes the following steps: generating a virtual 3D parameter and a template cube by a random abstraction layer generator in the first training phase; encoding the template cube by the 2D encoder; decoding the encoded template cube to generate the 2D edge layout image; encoding the 2D edge layout image by a pre-trained 3D encoder to generate a training 3D parameter and ending the first training phase when the training 3D parameter and the virtual 3D parameter are identical; inputting an actual training image to the 2D encoder in the second training phase; decoding the encoded actual training image by the 2D edge decoder to generate the 2D edge layout image; encoding the 2D edge layout image by the pre-trained 3D encoder to generate the training 3D parameter; and encoding the 2D edge layout image by a target 3D parameter to generate a target 3D parameter, ending the second training phase when the error of the target 3D parameter and the training 3D parameter is less than a preset threshold value, and the target 3D encoder acting as the 3D encoder.

Preferably, the 2D plane segment layout image, the 2D edge layout image, and the 2D corner layout image are processed using a loss function, and the loss function is presented as follows:

$$Loss = \mathcal{L}_{plane} + \mathcal{L}_{edge} + \mathcal{L}_{corner}$$

$$\mathcal{L}_{plane} = \mathcal{L}_{seg} + \lambda_s \mathcal{L}_{smooth}$$

$$\mathcal{L}_{smooth} = mean(|x_i - target_i|_1)$$

Wherein, Loss is a loss function, $L_{place}$ is a plane loss function. $L_{edge}$ is an edge loss function. $L_{corner}$ is a corner loss function. $L_{seg}$ is a segment loss function. $L_{smooth}$ is a smooth loss function, $\lambda_s$ is the weight for smoothness term, $x_i$ is the predicted output, and $target_i$ is the ground truth label.

Preferably, the input picture is provided by a camera, the camera has a camera intrinsic matrix, and a projected image of the 3D indoor scene image conforms to the following equation:

$$X_{2D} \equiv \pi(X_{3D} \mid K, P, scale)$$

$$K = \begin{bmatrix} f_x & 0 & c_x \\ 0 & f_y & c_y \\ 0 & 0 & 1 \end{bmatrix}$$

$$P = [R \mid T] \in \mathbb{R}^{3 \times 4}$$

Wherein, $X_{2D}$ is a projected image. $\pi$ refers to projection. $X_{3D}$ is a 3D indoor scene image. K is a camera intrinsic matrix of the camera. scale is a side-length ratio of a cube formed by an indoor scene where the camera is located. $f_x$ and $f_y$ are focal length coordinates of the camera. $c_x$ and $c_y$ are central point coordinates of the camera. R is a 3×3 rotation matrix. T is a 3×1 translation vector. P is a projection matrix.

Preferably, the 3D parameter includes a triaxial Euler rotation angle, a triaxial length ratio of the cube corresponding to the 3D indoor scene image, and the camera location of a camera outputting the output image.

As stated, for the indoor scene structural estimation system and the method thereof based on deep learning network in the present disclosure, the scene structural layout and the 3D parameter may be obtained through the two-phase estimations to achieve the purpose of outputting the 3D indoor scene image. Specifically, the indoor scene structural estimation system and the method thereof based on deep learning network in the present disclosure do not require any additional processes or optimization. Still, the 3D indoor scene image may directly be outputted, meaning an decrease in the amount to be operated and an increase in the efficiency of the operation.

BRIEF DESCRIPTION OF THE DRAWINGS

The patent or application file contains at least one drawing executed in color. Copies of this patent and/or patent application publication with color drawing(s) have been provided to the Office upon request and payment of the necessary fee has been submitted.

DESCRIPTION OF THE PREFERRED EMBODIMENTS

To facilitate the review of the technique characteristics, contents, advantages, and achievable effects of the present disclosure, the embodiments together with the drawings are described in detail as follows. However, the drawings are used only for the purpose of indicating and supporting the specification, which is not necessarily the real proportion and precise configuration after the implementation of the present disclosure. Therefore, the relations of the proportion and configuration of the attached drawings should not be interpreted to limit the actual scope of implementation of the present disclosure.

The advantages, features, and technical methods of the present disclosure are to be explained in detail with reference to the exemplary embodiments and the figures for the purpose of being more easily to be understood. Moreover, the present disclosure may be realized in different forms, and should not be construed as being limited to the embodiments set forth herein. Conversely, for a person skilled in the art, the embodiments provided shall make the present disclosure convey the scope more thoroughly, comprehensively, and completely. In addition, the present disclosure shall be defined only by the appended claims.

Figure 1:
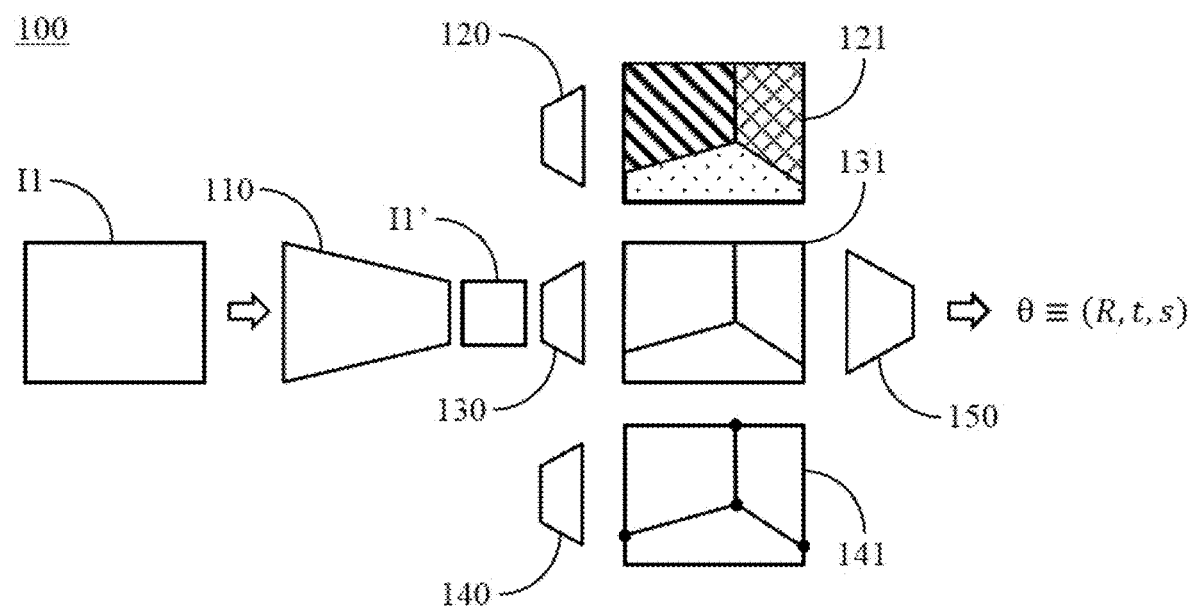
FIG. 1 is a schematic diagram of the indoor scene structural estimation system based on deep learning network in the present disclosure.

Please refer to FIG. 1, illustrating the schematic diagram of the indoor scene structural estimation system based on deep learning network in the present disclosure. As shown, the indoor scene structural estimation system based on deep learning network 100 in the present disclosure includes a 2D encoder 110, a 2D plane decoder 120, a 2D edge decoder 130, a 2D corner decoder 140, and a 3D encoder 150.

The indoor scene structural estimation are decoupled into two stages, namely the 2D layout estimation and 3D cuboid model representation through projective parameters estimation. The indoor scene structural estimation system based on deep learning network contains these two sub-tasks and may be applied either separately or jointly. In the first stage of our framework, the 2D layout is estimated through the multi-stream fully convolutional network (FCN) with the base of ResNet, which may predict the layout in the representations of corners, edges, and the semantic planes simultaneously as the final output without post-processing.

In the phase of the 2D layout estimation, the 2D encoder 110 receives an input image and encodes the input image. The 2D plane decoder 120 is connected to the 2D encoder 110, decodes the encoded input image, and generates a 2D plane segment layout image 121. The 2D plane decoder 130 is connected to the 2D encoder 110, decodes the encoded input image, and generates a 2D plane segment layout image 131. The 2D corner decoder 140 is connected to the 2D encoder 110, decodes the encoded input image, and generates a 2D corner layout image 141.

Wherein, the layout estimation is obtained without post-processing and the state-of-the-art is reached by adopting the effective training strategies. With the input of one single color image, the vanilla ResNet101 is taken as the 2D encoder 110 to extract the feature, three up-sampling conventional layers may respectively be used as the 2D plane decoder 120, the 2D edge decoder 130, and 2D corner decoder 140, and the skip-connections layers to share the features is captured. In detail, like the layout representation proposed in DeLay, the layout may be regarded as a five-class planar semantic segmentation problem. The last average-pooling layer and the fully-connected layers are removed in original ResNet101 and the fully-connected layer is replaced with the 1×1 convolutional layer following by bilinear up-sampling to upscale the feature maps with skipped connection from the corresponding afore-layer. To make the consistency in the dimension of feature maps, the additional convolutional layers are inserted before concatenating to the outputs of the 2D plane decoder 120, the 2D edge decoder 130, and 2D corner decoder 140. In the trunk of network, two extra dropout and batch-norm layers are appended before cony-classifier blocks to prevent overfitting on such a specific task.

On the other side, the corner detection may also be modified into similar framework. This model may be used not only for semantic planar segmentation but also for estimating the layout corners and edges. Thus, the network is also revised and demonstrated for multiple concurrent layout estimates on the representations of semantic plane as well as inner-outer corners in another work. Moreover, the encoded latent layout feature map is made as one universal intermediate representation for the 2D plane decoder 120, the 2D edge decoder 130, and 2D corner decoder 140 of multiple tasks, the layout segment (generating 2D plane segment layout image 121), the layout corner (generating 2D corner layout image 141) and the layout edge (generating 2D edge layout image 131). As a result, all these targets may be modeled in one multi-branches network as shown in FIG. 1. Under the configuration of our network design, all the tasks may be made to be trained jointly instead of the strategy of training on one branch and then fine-tuning for another in LayoutNet.

Specifically, regarding Semantic Layout in 2D Representation, under the Manhattan world assumption, each indoor scene is regarded as being composed of multiple orthogonal planes, and the layout of regular room may be further simplified into the cuboid model. From this perspective, the layout estimation may also be regarded as a region segmentation problem on each surface of cuboid. To describe the segments of these regions, it may be parameterized by the densely segmentation, or the borders or the points of these polygons. In the previous deep learning designs for layout estimation, several representations may be proposed, such as planar segment with semantic labels, scoring heatmap on the layout edges, and corner heatmaps.

Layout Segment: the dense region segment may be referred to semantic planar representations, and these planes may be labeled in five classes: front-wall, right-wall, left-wall, ceiling, and floor. It may then be formed as one semantic segmentation like problem with the labels on larger structure scale rather than object level segments.

Figure 2:
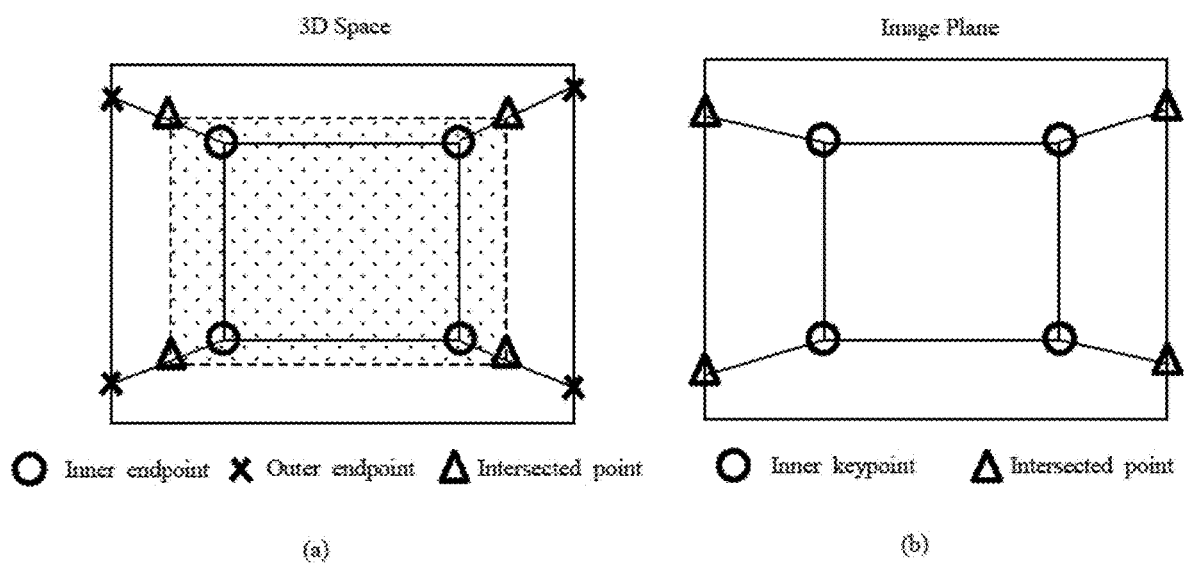
FIG. 2 is a schematic diagram of the corner layout of the indoor scene structural estimation system based on deep learning network in the present disclosure.

Layout Corner: In RoomNet, the corners may be estimated for each possible layout structure in nearly fifties-channel heatmaps which is inefficient, and thus LayoutNet reduced the categories of corners into only one channel. However, the corners in each room layout structure may be given by two kinds of points, one is the real corner inside the room (inner corner), the other is the intersected points with the camera margins and shown on the borders of image (outer corner), as illustrated in FIG. 2. In other words, these corners may be categorized into two classes rather than abundant channels nor as single one.

Layout Edge: The layout edge may be represented by the borders of the polygons. The detection of borders is to determine whether the pixel is the edges for the room layout and may be viewed as a binary classification problem.

As shown in FIG. 1, in the phase of the 3D cuboid model representation through projective parameters estimation, The 3D encoder 150 is connected to the 2D plane decoder 120, the 2D edge decoder 130, and the 2D corner decoder 140, receives the 2D plane segment layout image 121, the 2D edge layout image 131, and the 2D corner layout image 141, encodes the 2D plane segment layout image 121, the 2D edge layout image 131, and the 2D corner layout image 141 to generate a 3D parameter $\theta(R, t, s) \in \mathbb{R}^9$, and generates a 3D indoor scene image according to the 3D parameter $\theta$.

In this stage, the room may be regarded as one cuboid under the Manhattan World assumption. Under the assumption, the common rooms in the daily life are formed by the cuboid models. Most indoor structures may even be simply represented by one cuboid, and it is also the cases for the existing datasets and most indoor daily scenes. Thus, previous works are considered to model the 3D layout of various room scenes to be composed by boxes, and generated layout proposals based on 2D hand-craft cues and optimization-based pipeline. However, in computational geometry, the 2D corners may be considered to be the representation of 3D layout when depth information is reduced to the 2D space.

Based on this discovery, the 3D layout estimation may be formulated as one reconstruction task. Consequently, the task may then be converted to reconstruct the layout structure by estimating the viewpoint inside a deformed cuboid, and then the parameters may be formulated for the transformation and projection. Note that the layout shown on image space is the projected cube from 3D space with the corresponding transformations on cuboid relative to the camera pose. The 3D layout may be parameterized with such transformations to reconstruct layout in the canonical 3D coordinate. Moreover, the effectiveness of 3D layout parameters may be visualized by re-projecting the deformed cuboid back to the 2D space with the estimated projective parameters.

A deep learning network is made to predict the cuboid representation for the 3D layout. However, annotated 3D information is lacked for the supervised network. Thus, the synthesized data may be used with the strategy Abstract Layout Generation proposed in our work, and then the knowledge is delivered to the real case through transfer learning. With such formulation, the 3D room layout may be estimated with the representation of projective parameters from the 2D intermediate representation of layout estimated from stage one (the 2D layout estimation). The 3D layout estimation framework end-to-end may be made via deep networks.

Specifically, the 3D encoder 150 includes a first training phase and a second training phase.

Figure 3:
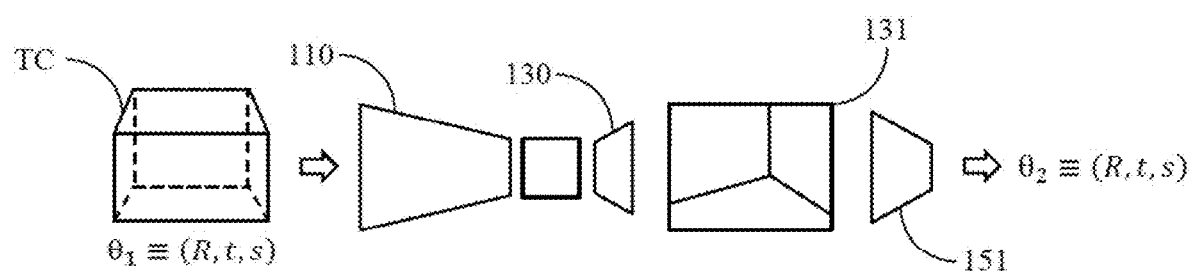
FIG. 3 is a schematic diagram of the first training phase of the indoor scene structural estimation system based on deep learning network in the present disclosure.

Please refer to FIG. 3, the schematic diagram of the first training phase of the indoor scene structural estimation system based on deep learning network in the present disclosure. As shown, in the first training phase, a virtual 3D parameter $\theta_t$ and a template cube TC are generated by a random abstraction layer generator. The template cube TC is inputted to the 2D encoder 110 for encoding. The 2D edge decoder 130 decodes the encoded template cube TC to generate the 2D edge layout image 131. The pre-trained 3D encoder 151 encodes the 2D edge layout image 131 to generate a training 3D parameter $\theta_2$. When the training 3D parameter $\theta_2$ and the virtual 3D parameter $\theta_1$ are identical, the first training phase ends.

The first training phase as mentioned above is related to Regression Forwarding Network. The task may be formulated as a regression task on the external scaling and transformation of the cuboid. The learning-based model such as convolutional neural network (CNN) may be applied to learn these projective transformation parameters $\theta_t$ from the input data. It may thus be formed as one regression model with predicted parameters $\theta_p$ regressed toward target parameters $\theta_t$.

Nevertheless, it is a challenge to train such a regression model since most of the datasets for the layout estimation do not provide any 3D annotations. The datasets for spatial layout are often annotated with 2D information such as the shapes of polygon for layout and the image coordinates for the corners. It is difficult to "transform" these 2D annotations into the target 3D parameter space $\theta_t$ as the supervised signals for the regression network.

Therefore, the problem is formulated as follows. The original task is to regress the model for the target projective parameters $\theta_t \in \mathbb{R}^9$ from the input space $I \in \mathbb{R}^{H \times W}$. Under this configuration, the intermediate 2D layout representation $\varepsilon \in \mathbb{R}^{H \times W}$ is considered, namely the estimate of 2D layout network in the 2D layout estimation phase. The key value for the task decoupling is that the intermediate layout representation is easy to be synthesized by transforming the deformed cuboid box and projecting the edges of box onto the image plane. As a result, a lot of reasonable samples may be acquired through random generating target parameters $\theta_g$ as well as the corresponding 2D layout representation input $I_g \equiv \varepsilon_g$ for the regression task, by using the transformation and projection modules. The equation is presented as follows:

$$X_{2D} = \pi(X_{3D} | K, P, \text{scale})$$

Where K is the camera intrinsic matrix assumed to be given in the camera calibration procedure and P is the projection matrix.

Correspondingly, these paired signals may be taken for training a regression model to learn the encoding for the target parameter. With such a strategy, the ill-posed regression task may be reformed and the challenge of lacking 3D annotations may be overcome in the existing datasets. The design of our regression network is composed of several compounded layers of strided-convolutional layer with ReLU non-linearity activation and 1×1 convolutional layer acted as fully connected layers at the end of the network for the target projective parameters $\Theta \in \mathbb{R}^9$ of the cuboid layout representation.

Figure 4:
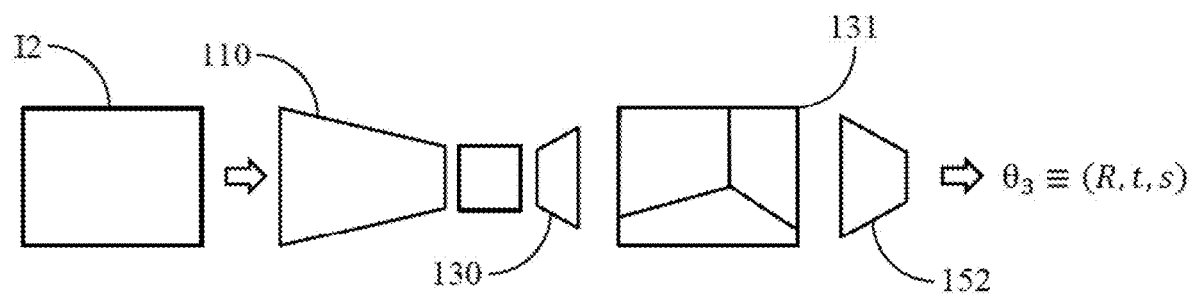
FIG. 4 is a schematic diagram of the second training phase of the indoor scene structural estimation system based on deep learning network in the present disclosure.

Please refer to FIG. 4, illustrating a schematic diagram of the second training phase of the indoor scene structural estimation system based on deep learning network in the present disclosure. As shown, in the second training phase, an actual training image RI is inputted to the 2D encoder 110, and the 2D edge decoder 131 decodes the encoded actual training image RI to generate the 2D edge layout image 131. The 2D edge layout image 131 is inputted to the pre-trained 3D encoder 151 and encoded to generate the training 3D parameter $\theta_2$, and the 2D edge layout image 131 is inputted to a target 3D encoder 152 and encoded to generate a target 3D parameter $\theta_3$. When the error of the target 3D parameter $\theta_3$ and the training 3D parameter $\theta_2$ is less than a preset threshold value, the second training phase ends and the target 3D encoder 152 acts as the 3D encoder 150.

The above-mentioned second training phase is related to Transfer Learning Network. In addition to the synthesized data, the trained regression model may be made to work on the real signals. The regression model should only work in the case of 2D layout represented in confident, i.e., the generated layout edges from ground truth. The input sample may be made by connecting the annotated corner coordinates in $P \in \mathbb{R}^2$ from the ground truth of dataset to acquire the perfect layout edge $\varepsilon_r$. In such configuration, it may then be evaluated directly with the pre-trained model on the fake samples, and the performance may achieve 93% in the metric of 2D pixel-wise accuracy in LSUN Layout dataset.

Nevertheless, it is hard to be applied in layout estimate pipeline, due to the fact of that no perfect layout edge may be provided for prediction from the real outputs of CNNs. However, the generality of the intermediate representation makes it extensible to the output of previous stage which is also in the same space—2D layout representation in edge map. Though the estimate of layout edge is not as perfect as the one generated from ground truth, the transfer learning strategy may be used to make a new network learn to encode the parameters from the pre-trained weight fitting on fake samples. Thus, an end-to-end framework is made for the 3D layout estimation via pure deep networks instead of any optimization or post-processing.

In the previous work, it is found that if the vanilla semantic segmentation criterion is directly applied on planar layout estimation, the result often suffers from distortion or tears apart from the center of planes and also "wavy curves" (rather than straight lines) mentioned in DeLay. The experimental results of our trials are shown in the (a) of FIG. 5 which depicts examples are far from polygons of planar representation. Hence, the smoothness term is imposed to alleviate the artifacts, and enforce the layout prediction smoother and much straight on the edges, and thus get the better qualitative estimation.

In contrast, the 2D plane segment layout image, the 2D edge layout image, and the 2D corner layout image are processed using a loss function, and the loss function is presented as follows:

$$Loss = \mathcal{L}_{plane} + \mathcal{L}_{edge} + \mathcal{L}_{corner}$$

$$\mathcal{L}_{plane} = \mathcal{L}_{seg} + \lambda_s \mathcal{L}_{smooth}$$

$$\mathcal{L}_{smooth} = mean(|x_i - target_i|_1)$$

Wherein, Loss is a loss function, $L_{place}$ is a plane loss function. $L_{edge}$ is an edge loss function. $L_{corner}$ is a corner loss function. $L_{seg}$ is a segment loss function. $L_{smooth}$ is a smooth loss function, $\lambda_s$ is the weight for smoothness term, $x_i$ is the predicted output, and $target_i$ is the ground truth label.

More explanations about $L_{seg}$ are exemplified as follows:

The core objective function for planar layout segments is multi-class cross-entropy loss $L_{seg}$, the most common loss function in semantic segmentation task, the pixel-wise classification problem, and this objective function is given by $$\mathcal{L}_{seg}(x, target) = CE(x, target)$$

Wherein, x is the predicted output, target is the ground truth segmentation label, and the CE means the cross-entropy function mathematically.

Where x is the output of network for each single estimate which is a multiple dimensional tensor shaped in (channel; height; width), the channel is the same as the classes for the task, and five classes for semantic planar segmentation are provided.

More explanations about $L_{smooth}$ are exemplified as follows:

Though the vanilla semantic segmentation loss does the job for planar segmentation task, the region of the estimated planes occasionally distort from inside instead of pleasure and confident outcomes. These artifacts need to be decreased for the more reasonable planar prediction, and the effective method is to smooth the output in favor of post-processing. However, an extra smoothness term $L_{smooth}$ may be applied in our objective loss function which encourages to minimize the pixel-wise distance between ground truth and segmented layout in each planar channel c and thus smooth the prediction.

$$\mathcal{L}_{smooth} = mean(\ell(x, target)),$$

$$\ell(x, target) = \{|x_1 - target_1|_1, \ldots, |x_c, target_c|_1\}$$

Wherein, x is the predicted output, target is the ground truth label, and the subscript i means the i-th channel of segment; "mean" is the average of those i items.

Figure 5:
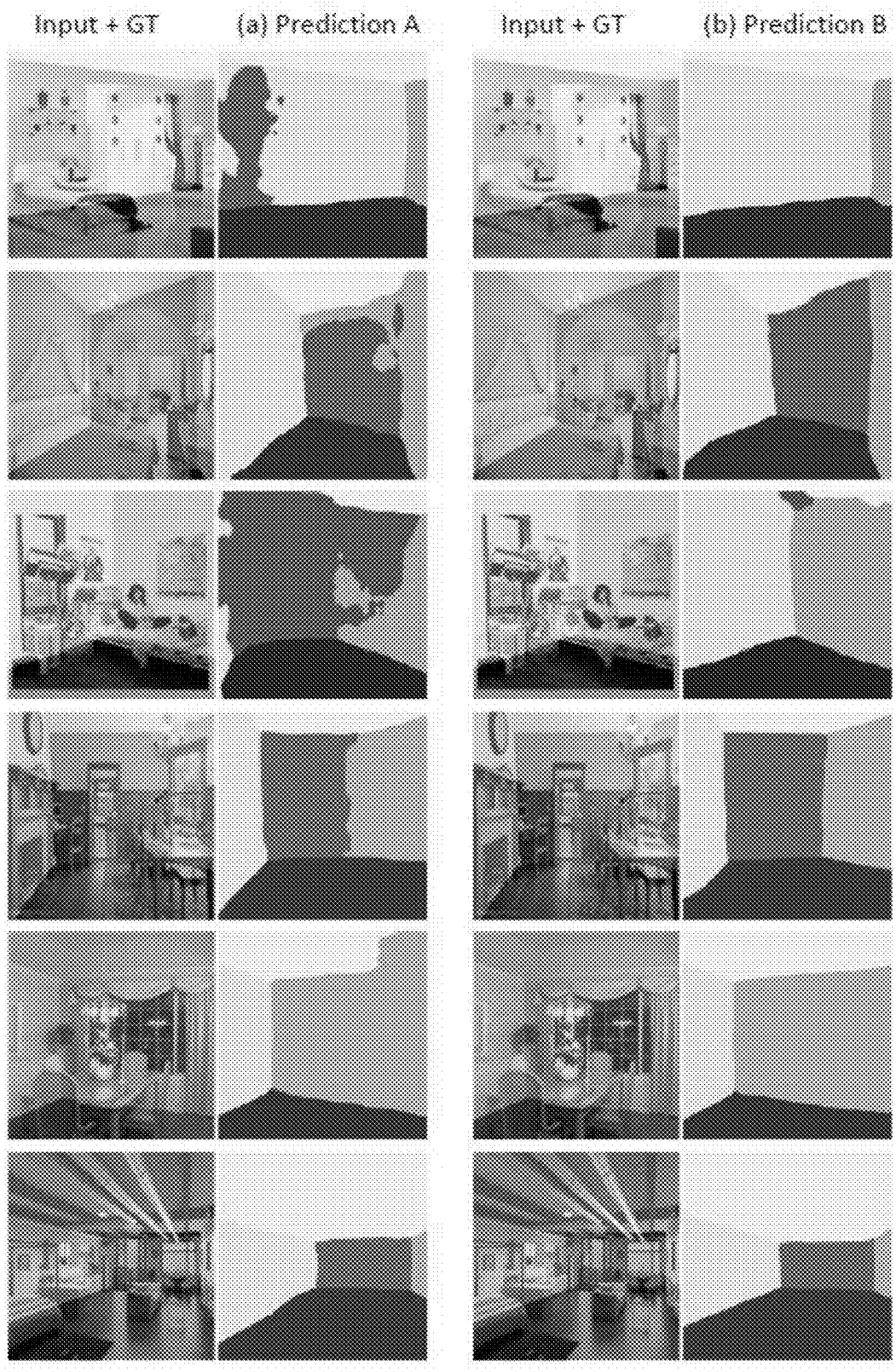
FIG. 5 is a schematic diagram of the comparison of the layout estimation results for model training (a) without and (b) with smoothness terms in the present disclosure.

The results in FIGS. 5.1 (a) and (b) show the visual effectiveness of applying additional constraints. Though not much improvement is found in quantitative measure (decreasing error rate performance at about 1%), the final visualization results demonstrate that it is helpful to provide a smoother surface prediction of cluttered scenes.

Explanations in detail regarding $L_{edge}$ and $L_{corner}$ are presented as follows:

The tasks for corner and edge detection may be viewed as binary classification on pixel-level, and thus the loss function may be given by the binary cross-entropy, $$\mathcal{L}_{edge}(x, target) = BCE(x, target),$$

$$\mathcal{L}_{corner}(x, target) = \Sigma BCE(x_i - target_i)$$

Wherein, x is the predicted binary classification output pixel-wise map for corner and edge, and target is the ground truth heat map representing the corners and edges. BCE means the binary cross-entropy. Mathematically, the cross entropy for classification between two probability distributions p and q is $H(p,q) = -\Sigma_{i=1}^{class} p_i(x) \log q_i(x)$; for binary classification-like case, it can be expanded as $H(p,q) = -p(x) \log q(x) + (1-p(x)) \log(1-q(x))$.

In the edge detection task, the output and target is to determine whether one pixel belongs to a layout structure edge. However, the corner may be used to detect the inner and outer corner separately. This would be the summation of loss applied on the two-channel corner output maps.

All in all, the criterion for the planar layout task is, $$\mathcal{L}_{plane} = \mathcal{L}_{seg} + \lambda_s \mathcal{L}_{smooth}$$

And the overall objective loss function for our network is the summation for these three branches. The overall loss function for model training is given by, $$Loss_{Net2D} = \mathcal{L}_{plane} + \mathcal{L}_{edge} + \mathcal{L}_{corner}$$

The input picture is provided by a camera, the camera has a camera intrinsic matrix, and a projected image of the 3D indoor scene image conforms to the following equation:

The approach is represented may be represented by two components, namely the scalable cuboid and camera pose. The parameters for the camera pose are decomposed into translation vector T and rotation matrix R, in which three parameters are needed for the position of camera and three parameters for the rotation angles along three coordinate axes, represented in quaternion. Moreover, three more parameters are needed for the scaling along three axes of the unit box, template cube placing at the origin of the canonical space. Let $X_{3D} \in \mathbb{R}^{3 \times N}$ denotes the 3D coordinates of eight keypoints (N=8) belonging to the unit box, and the locations of box keypoints viewed by a specific camera pose, and $X_{2D} \in \mathbb{R}^{2 \times N}$ denotes the corresponding 2D coordinates in the image space. Thus the relationship between two coordinates is given by $$X_{2D} = \pi(X_{3D} | K, P, scale)$$

Where K is the camera intrinsic matrix assumed to be given in the camera calibration procedure and P is the projection matrix given by $$K = \begin{bmatrix} f_x & 0 & c_x \\ 0 & f_y & c_y \\ 0 & 0 & 1 \end{bmatrix}$$

$$P = [R | T] \in \mathbb{R}^{3 \times 4}$$

Wherein, $X_{2D}$ is a projected image. $\pi$ refers to projection. $X_{3D}$ is a 3D indoor scene image. K is a camera intrinsic matrix of the camera. scale is a side-length ratio of a cube formed by an indoor scene where the camera is located. $f_x$ and $f_y$ are focal length coordinates of the camera. $c_x$ and $c_y$ are central point coordinates of the camera. R is a 3×3 rotation matrix. T is a 3×1 translation vector. P is a projection matrix.

Note that the rotation matrix $R \in \mathbb{R}^{3 \times 3}$ and the translation vector $T \in \mathbb{R}^3$ contain the extrinsic parameters for camera pose, and the rotation matrix is represented by a quaternion vector $\hat{q}$ as follows:

$$R = \text{qaut2mat}(\hat{q}) \in \mathcal{SO} \quad (3)$$

Wherein, quat2mat is a pseudo math function that can convert the queternion vector to the rotation matrix and the result R is in the SO(3) space (special orthogonal group).

Hence, the 3D cuboid layout may be extracted from 2D space by estimating the projective parameters for the cuboid model.

Wherein, the 3D parameter θ may include a triaxial Euler rotation angle, a triaxial length ratio of the cube corresponding to the 3D indoor scene image, and the camera location of a camera outputting the output image, each of which corresponds to three axes, thus totaling nine parameters.

Although explanations on the concept of the indoor scene structural estimation method based on deep learning network have been elaborated along with the foregoing descriptions of the indoor scene structural estimation system based on deep learning network, the flow chart is illustrated in detail below for the sake of clarity.

Figure 6:
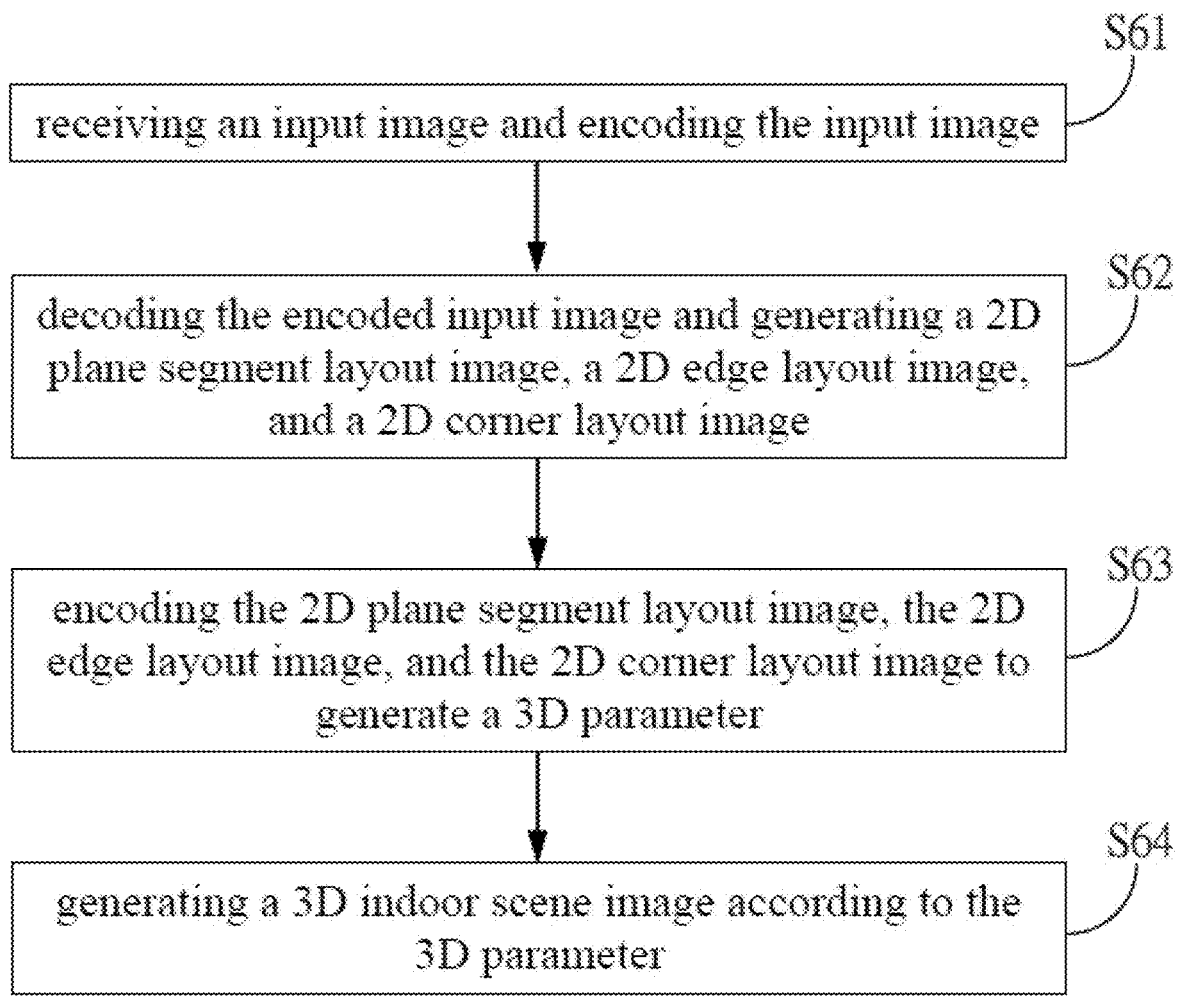
FIG. 6 is a first flow chart of the indoor scene structural estimation method based on deep learning network in the present disclosure.

Please refer to FIG. 6, illustrating the first flow chart of the indoor scene structural estimation method based on deep learning network in the present disclosure. As shown, the present disclosure further provides an indoor scene structural estimation method based on deep learning network, applicable to including a 2D encoder, a 2D plane decoder, a 2D edge decoder, a 2D corner decoder, and a 3D encoder. Wherein, the indoor scene structural estimation method based on deep learning network includes the following steps:

Step S61: receiving an input image and encoding the input image.

Step S62: decoding the encoded input image and generating a 2D plane segment layout image, a 2D edge layout image, and a 2D corner layout image.

Step S63: encoding the 2D plane segment layout image, the 2D edge layout image, and the 2D corner layout image to generate a 3D parameter.

Step S64: generating a 3D indoor scene image according to the 3D parameter.

Figure 7:
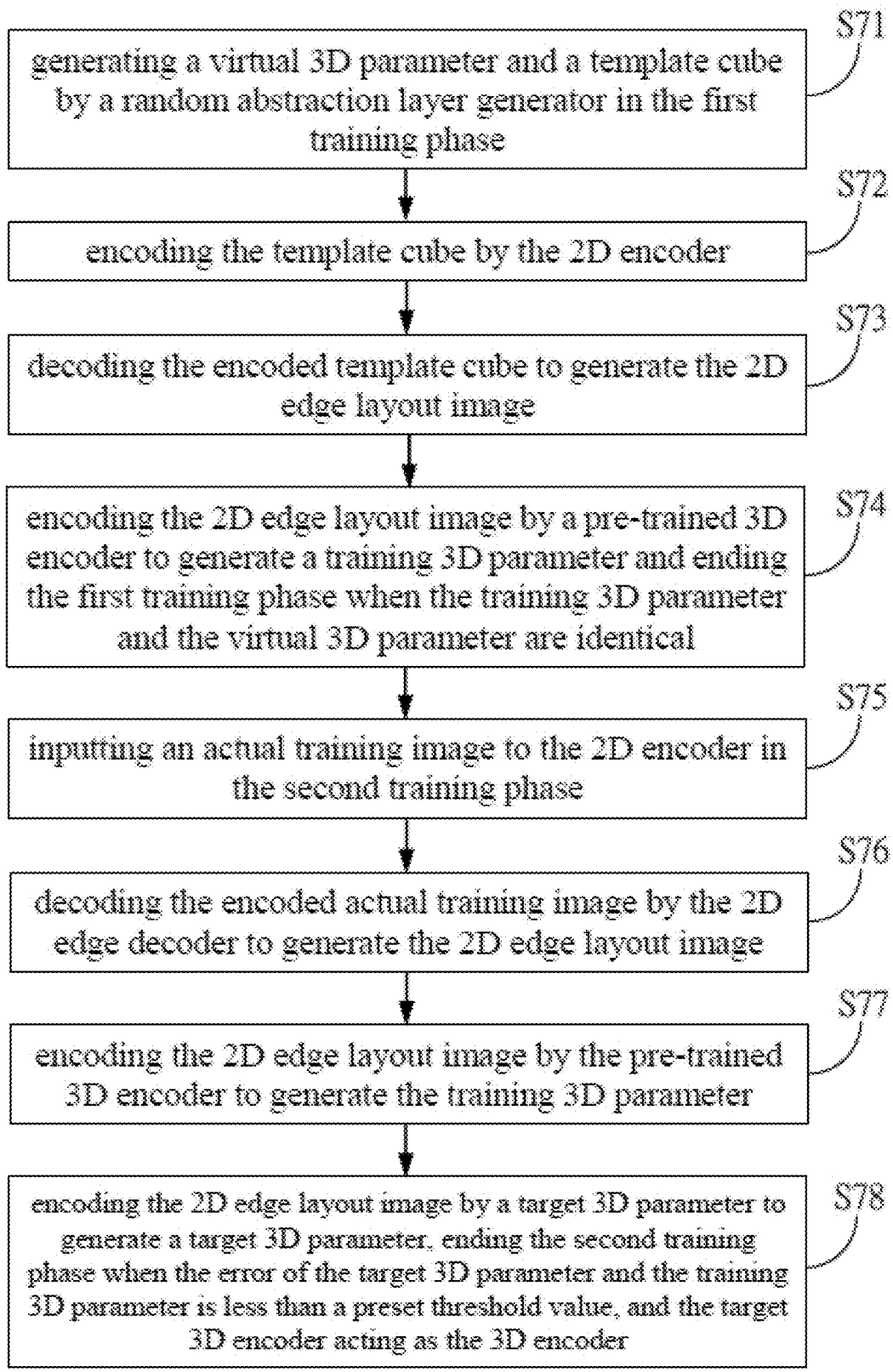
FIG. 7 is a second flow chart of the indoor scene structural estimation method based on deep learning network in the present disclosure.

Please refer to FIG. 7, illustrating the second flow chart of the indoor scene structural estimation method based on deep learning network in the present disclosure. As shown, regarding the neural network training, the 3D encoder may include a first training phase and a second training phase. The indoor scene structural estimation method based on deep learning network further includes the following steps:

Step S71: generating a virtual 3D parameter and a template cube by a random abstraction layer generator in the first training phase.

Step S72: encoding the template cube by the 2D encoder.

Step S73: decoding the encoded template cube to generate the 2D edge layout image.

Step S74: encoding the 2D edge layout image by a pre-trained 3D encoder to generate a training 3D parameter and ending the first training phase when the training 3D parameter and the virtual 3D parameter are identical.

Step S75: inputting an actual training image to the 2D encoder in the second training phase.

Step S76: decoding the encoded actual training image by the 2D edge decoder to generate the 2D edge layout image.

Step S77: encoding the 2D edge layout image by the pre-trained 3D encoder to generate the training 3D parameter.

Step S78: encoding the 2D edge layout image by a target 3D parameter to generate a target 3D parameter, ending the second training phase when the error of the target 3D parameter and the training 3D parameter is less than a preset threshold value, and the target 3D encoder acting as the 3D encoder.

Specifically, the 2D plane segment layout image, the 2D edge layout image, and the 2D corner layout image are processed using a loss function, and the loss function is presented as follows:

$$\text{Loss} = \mathcal{L}_{plane} + \mathcal{L}_{edge} + \mathcal{L}_{corner}$$

$$\mathcal{L}_{plane} = \mathcal{L}_{seg} + \lambda_s \mathcal{L}_{smooth}$$

$$\mathcal{L}_{smooth} = \text{mean}(|x_i - \text{target}_i|_1)$$

Wherein, Loss is a loss function, $L_{place}$ is a plane loss function. $L_{edge}$ is an edge loss function. $L_{corner}$ is a corner loss function. $L_{seg}$ is a segment loss function. $L_{smooth}$ is a smooth loss function, $\lambda_s$ is the weight for smoothness term, $x_i$ is the predicted output, and $\text{target}_i$ is the ground truth label.

The input picture as mentioned above is provided by a camera, the camera has a camera intrinsic matrix, and a projected image of the 3D indoor scene image conforms to the following equation:

$$X_{2D} \equiv \pi(X_{3D} \mid K, P, \text{scale})$$

$$K = \begin{bmatrix} f_x & 0 & c_x \\ 0 & f_y & c_y \\ 0 & 0 & 1 \end{bmatrix}$$

$$P = [R \mid T] \in \mathbb{R}^{3 \times 4}$$

Wherein, $X_{2D}$ is a projected image. π refers to projection. $X_{3D}$ is a 3D indoor scene image. K is a camera intrinsic matrix of the camera. scale is a side-length ratio of a cube formed by an indoor scene where the camera is located. $f_x$ and $f_y$ are focal length coordinates of the camera. $c_x$ and $c_y$ are central point coordinates of the camera. R is a 3×3 rotation matrix. T is a 3×1 translation vector. P is a projection matrix.

To be specific, the 3D parameter includes a triaxial Euler rotation angle, a triaxial length ratio of the cube corresponding to the 3D indoor scene image, and the camera location of a camera outputting the output image.

The detailed explanation and embodiment of the indoor scene structural estimation method based on deep learning network in the present disclosure have been illustrated together with the description of the indoor scene structural estimation system based on deep learning network in the present disclosure as mentioned above. Therefore, the same description shall not be repeated again.

EXPERIMENT RESULTS

LSUN Room Layout dataset is used, which contains 4,000 training images, 394 validation, and 1,000 testing images for evaluating 2D semantic planar segmentation and corner estimation results. Since there are no public labels for the testing set, a method is evaluated on the validation set with LSUN Room Layout official toolkit like the previous works. In addition, the generalization capability of the model is evaluated on the Hedau dataset, which is a challenging dataset due to its strict labeling. Any 3D accuracy metrics may not be evaluated for the 3D layout estimation. These two commonly used datasets do not contain any 3D annotations for the layout estimation. Instead, the 3D layout estimation results may be evaluated with 2D metrics on the re-projection of 3D layout.

Note that the model is only trained on the training split of LSUN Room Layout and directly tested on the testing split of Hedau dataset without fine-tuning on its training data. During the training, random color jittering is applied for slightly changing in the lightness and contrast of color images to increase the diversity of scenes. Besides these common augmentation techniques, a semantic random horizontal flipping is further proposed by exchanging the semantic labels in the left and right planes for more effective scene augmentation as well as the Layout Degeneration augmentation strategy presented in the work. The effectiveness of the proposed layout-specific objective and the layout degeneration strategy for augmentation are further demonstrated, which may improve the results not only quantitatively but also qualitatively. Furthermore, the time efficiency of the approach compared to others is also reported in the experiment.

The performance of the proposed approach is measured in 2D and 3D layout estimations through the following experimental evaluations: 2D pixel-wise accuracy for semantic planar segmentation in the single task and multi-task networks, 2D corner prediction accuracy for the keypoint corner detection, re-projected accuracy on 2D metrics on the estimated 3D projective parameters, and the visualization for the 3D cuboid rooms of the estimated parameters.

TABLE 1

The pixel-wise accuracy performance benchmarking on LSUN Room Layout datasets for different approaches. Note that the data in the table is extracted from their papers.

| Method | Pixel Error (%) | Post-processing |
| --- | --- | --- |
| Hedau (2009) | 24.23 | (*) |
| DeLay (2016) | 10.63 | layout optimization |
| CFILE (2016) | 7.95 | proposal-ranking |
| RoomNet (2017) | 9.86 | recurrent 3-tier |
| Zhang (2017) | 12.49 | proposal-ranking |
| ST-PIO (2017) | 5.48 | physical-inspired opt. |
| ST-PIO (2017) w/o optim. | 11.28 | proposal-ranking |
| LayoutNet (2018) | 11.96 | No |
| 2D baseline, planar seg. | 9.75 | No |
| 2D multi-task | 7.04 | No |
| 2D baseline w/degen. aug. | 6.25 | No |
| 2D multi-task w/degen. aug. | 6.73 | No |
| 3D re-projected of present invention | 6.89 | No |
| 2D/3D of present invention (end-to-end) | 11.36 | No |

The performance of our layout estimation results are shown in the Table 1. First, DeepRoom 2D for planar segmentation is taken without any training strategies as the baseline model, which may already achieve 9.75% error rate. Moreover, the extended model DeepRoom 2D multi-task may reduce the error rate to 7.04%, which is 2.71% better than the baseline. Moreover, the performance of the ones trained with Layout Degeneration are comparable to the state-of-the-art method in the LSUN Challenge and 6.73% and 6.25% pixel-wise error rate may be achieved for the single and multi-task networks, respectively. Furthermore, if compared under a more fair condition, the proposed model may even beat the best method ST-PIO (ST-PIO (2017) w/o optim.) which eliminates the extremely high-cost physical-inspired optimization but remains the post-processing for proposal ranking.

The results from the direct 2D estimation networks and the re-projected performance from the 3D parameter estimation network are listed in the Table 1. For the 3D projective parameters, the DeepRoom 3D which takes the ground truth generated edge map as input, may achieve the similar performance as the 2D network in the metric of pixel-wise accuracy. Furthermore, the end-to-end approach of our DeepRoom 2D/3D may achieve about 10% error rate, the similar level of the other state-of-the-art method, LayoutNet [34], without post-processing.

TABLE 2

The corner detection performance benchmarking on LSUN Room Layout datasets.

| Method | Corner Error (%) | Post-processing |
| --- | --- | --- |
| Hedau (2009) | 15.48 | (*) |
| RoomNet (2017) | 6.30 | recurrent 3-tier |
| ST-PIO (2017) | 3.95 | physical-inspired opt. |
| ST-PIO (2017) w/o optim. | 8.55 | proposal-ranking |
| LayoutNet (2018) | 7.63 | No |
| Deep Room 2D | 7.48 | No |

The performance of the multi-task 2D layout estimation network is compared with the approaches also using the corner-based and multi-task techniques. The corners of our method are extracted from the peaks of the heatmap. However, the existed methods cooperated with the post-processing may give the much refined coordinates. From the corner error shown in Table 2, the approach may still achieve slightly more accurate than LayoutNet without any post-processing. The performance is comparable to the RoomNet with much compact representation, only two channels rather than fifties.

Figure 8:
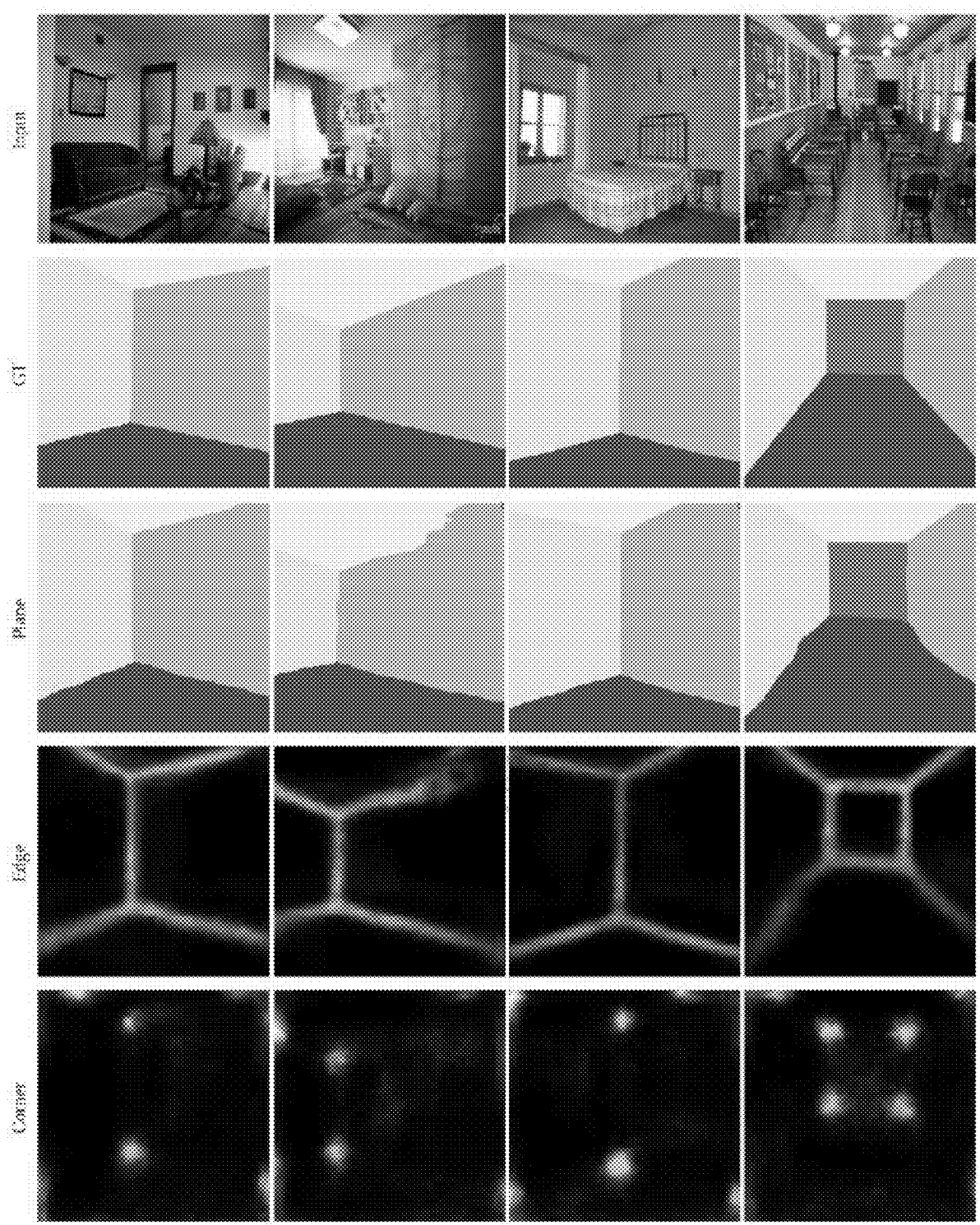
FIG. 8 is a first schematic diagram of the outputs of the multi-task network in the present disclosure.
Figure 9:
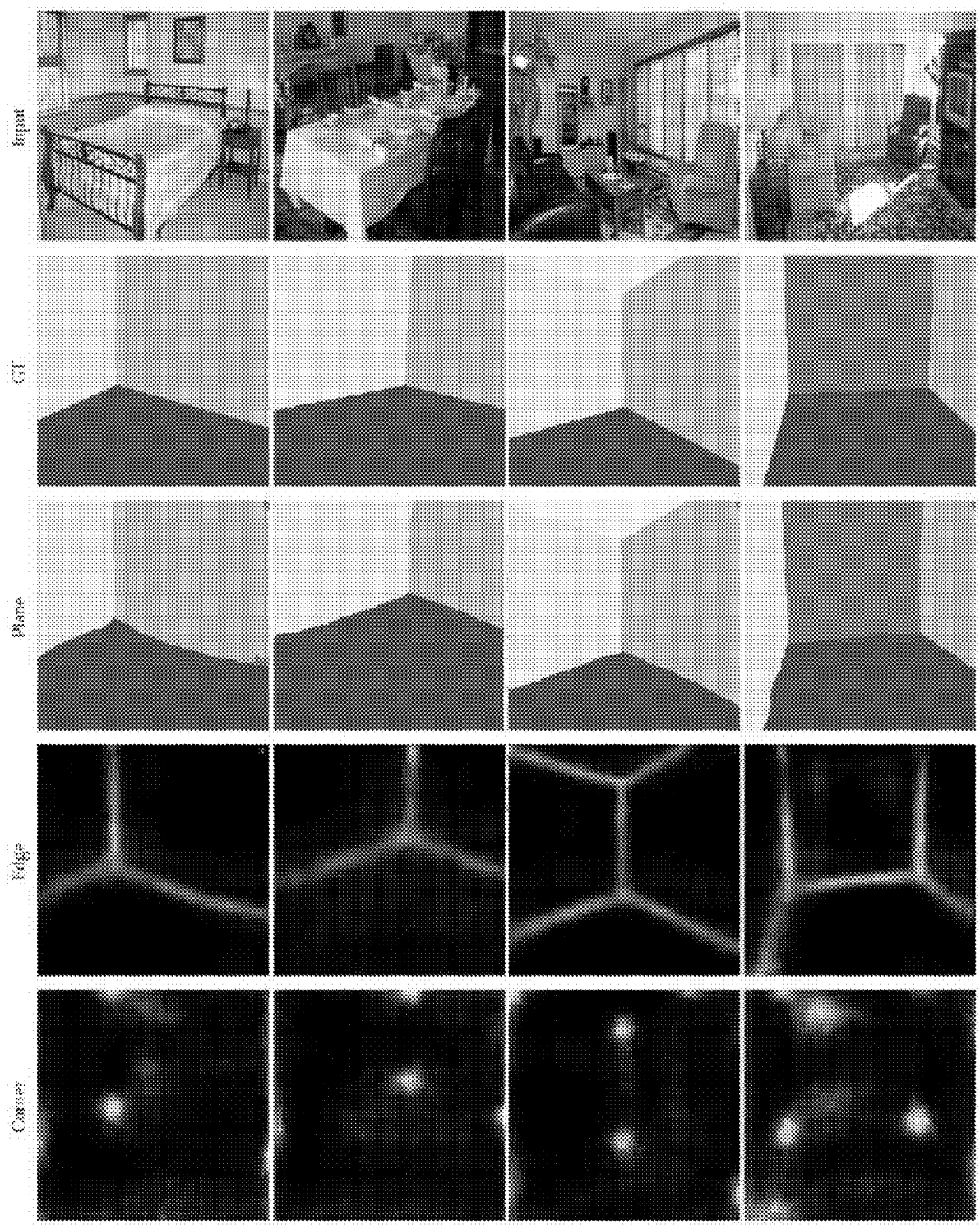
FIG. 9 is a second schematic diagram of the outputs of the multi-task network in the present disclosure.
Figure 10:
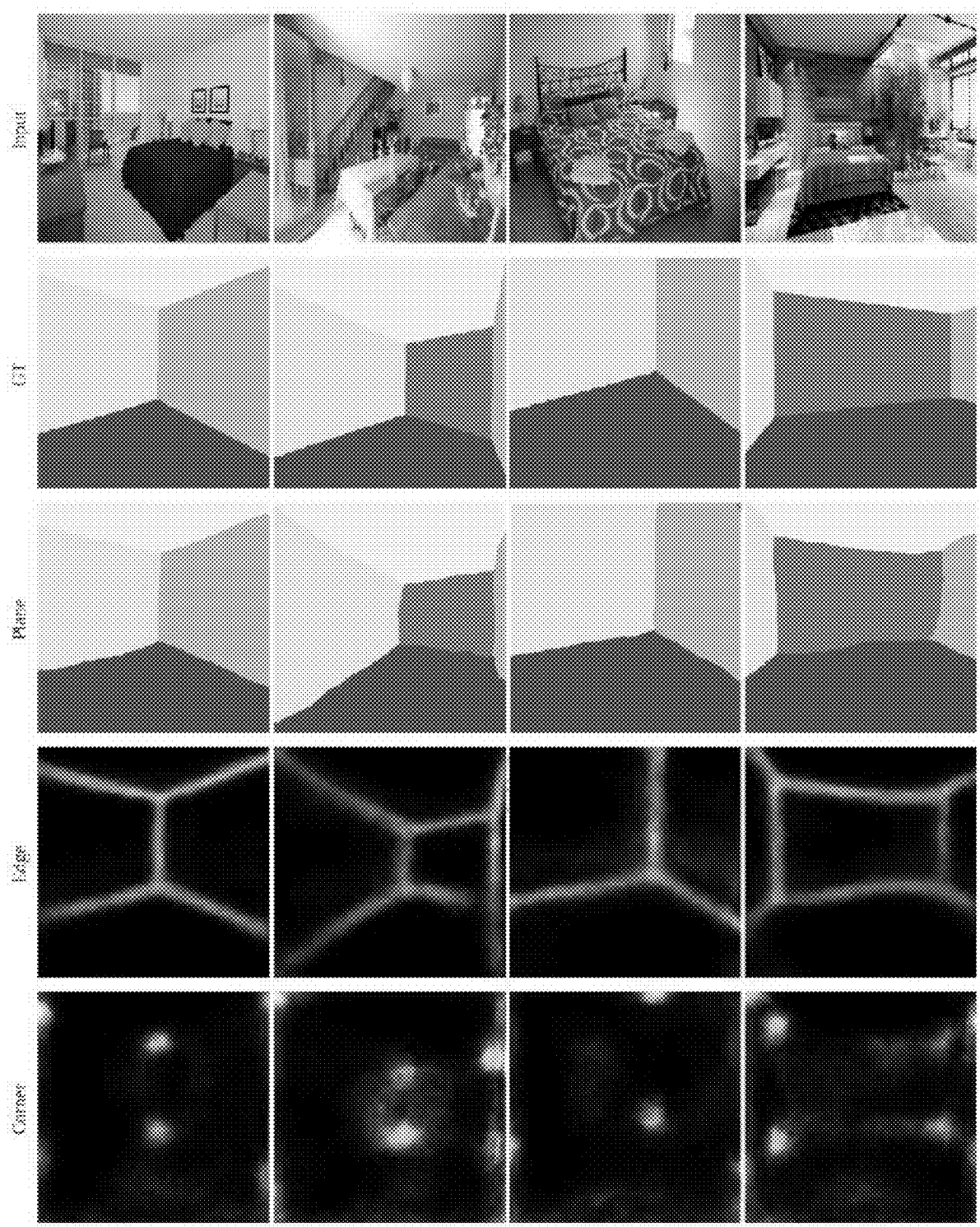
FIG. 10 is a third schematic diagram of the outputs of the multi-task network in the present disclosure.

First, the effects of the proposed layout objective criteria is demonstrated for layout segmentation. Under the supervision of the additional smoothness term, the predictions come smoother and alleviate the artifacts of jagged lines, as shown in FIG. 5 (b), the estimated results look more like polygons instead of distorted segment regions. The visual outputs are also shown for our multi-stream networks with the full training strategies, including Layout Degeneration as well as layout tailored objective criteria in FIG. 8, FIG. 9, and FIG. 10. They mostly contain sharp but straight edges and strong consistencies in each predicted planar surface; and the inner-outer corner representation may successfully give the detection for the two kinds of keypoints in layout. The detected layout edges are as impressive as the planar segmentation as they all produced by the same one multi-task network.

Figure 11:
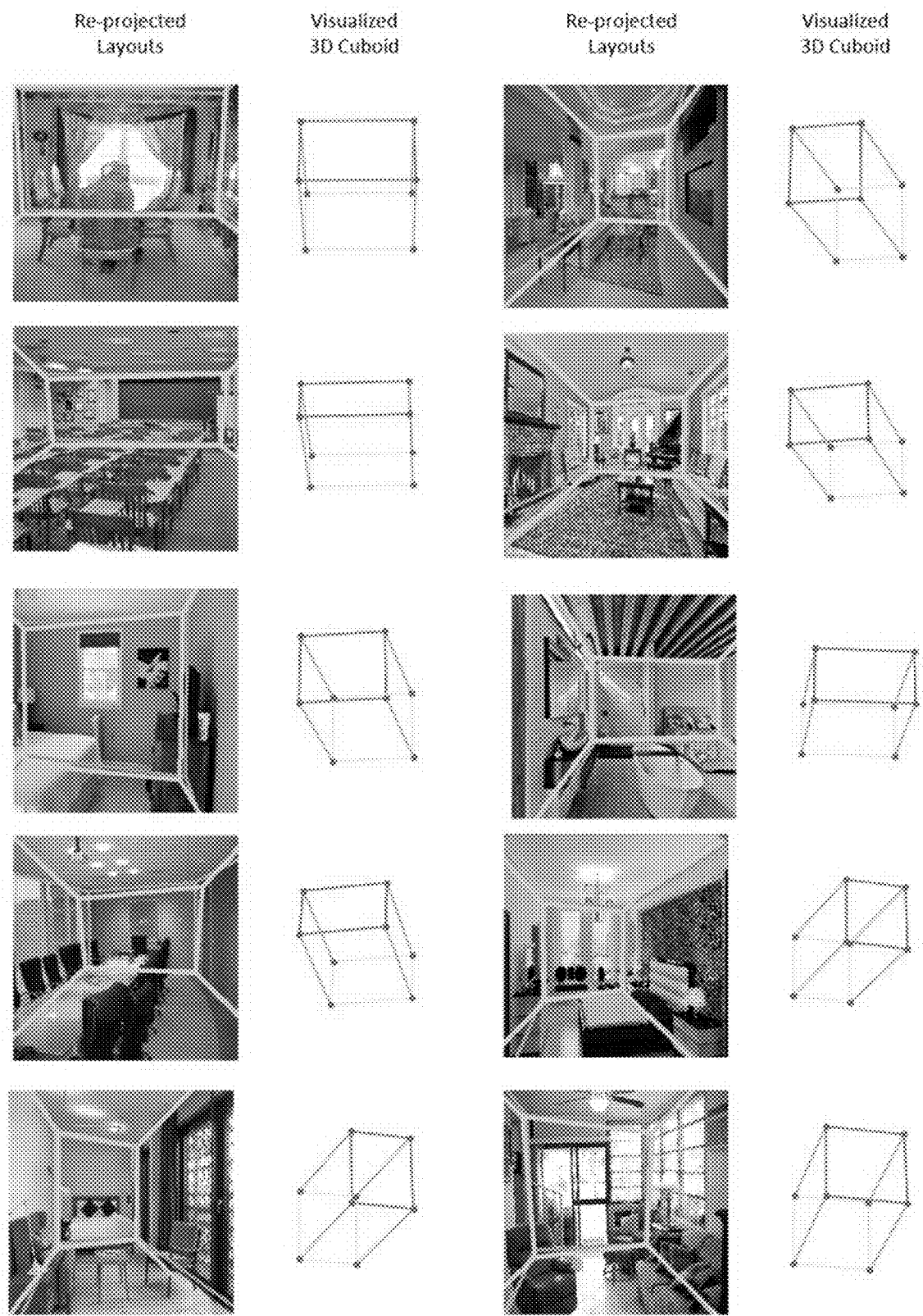
FIG. 11 is a first schematic diagram of the 3D cuboid and re-projected layout on LSUNRoom in the present disclosure.
Figure 12:
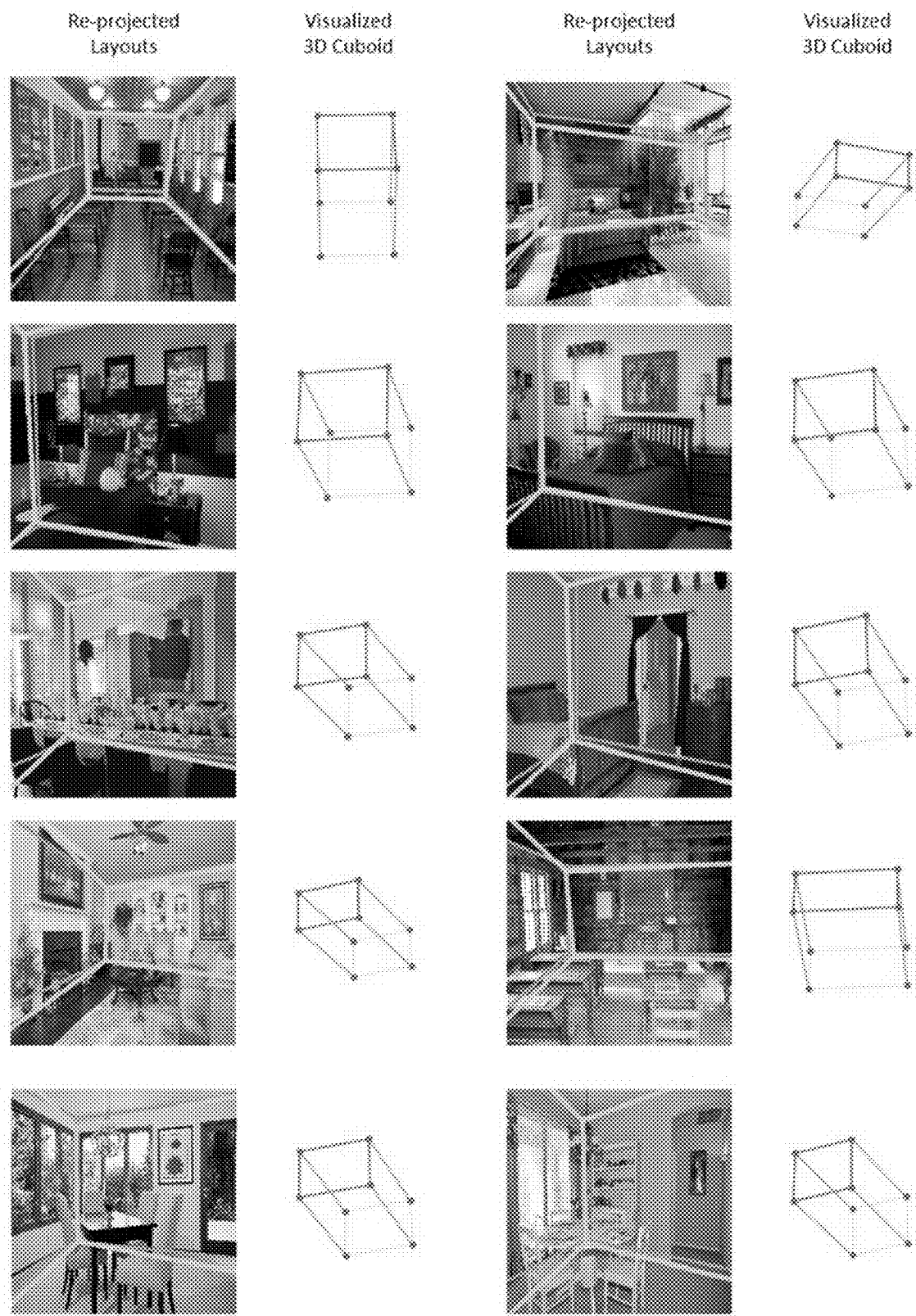
FIG. 12 is a second schematic diagram of the 3D cuboid and re-projected layout on LSUNRoom in the present disclosure.

For the evaluation on the estimated 3D room layout, the transformed cuboids is visualized along with the re-projected results in FIG. 11 and FIG. 12, in which the results are amazing for the 3D layout estimation with only a single image. As shown in FIG. 11 and FIG. 12, the even columns are the transformed cuboid with the estimated parameters. The odd columns are the overlapped results, the input color image, and the ground truth in darker pink and the re-projected layout in the light purple.

TABLE 3

The performance benchmarking on Hedau testing set.

| Method | Pixel Error (%) |
| --- | --- |
| Hedau et al. (2009) | 21.20 |
| Mallya et al. (2015) | 12.83 |
| DeLay (2016) | 9.73 |
| CFILE (2016) | 8.67 |
| RoomNet (2017) recurrent 3-tier | 8.36 |
| Zhang (2017) et al. | 12.70 |
| ST-PIO (2017) | 6.60 |
| DeepRoom 2D | 7.41 |
| DeepRoom 3D re-projected | 9.97 |

Figure 13:
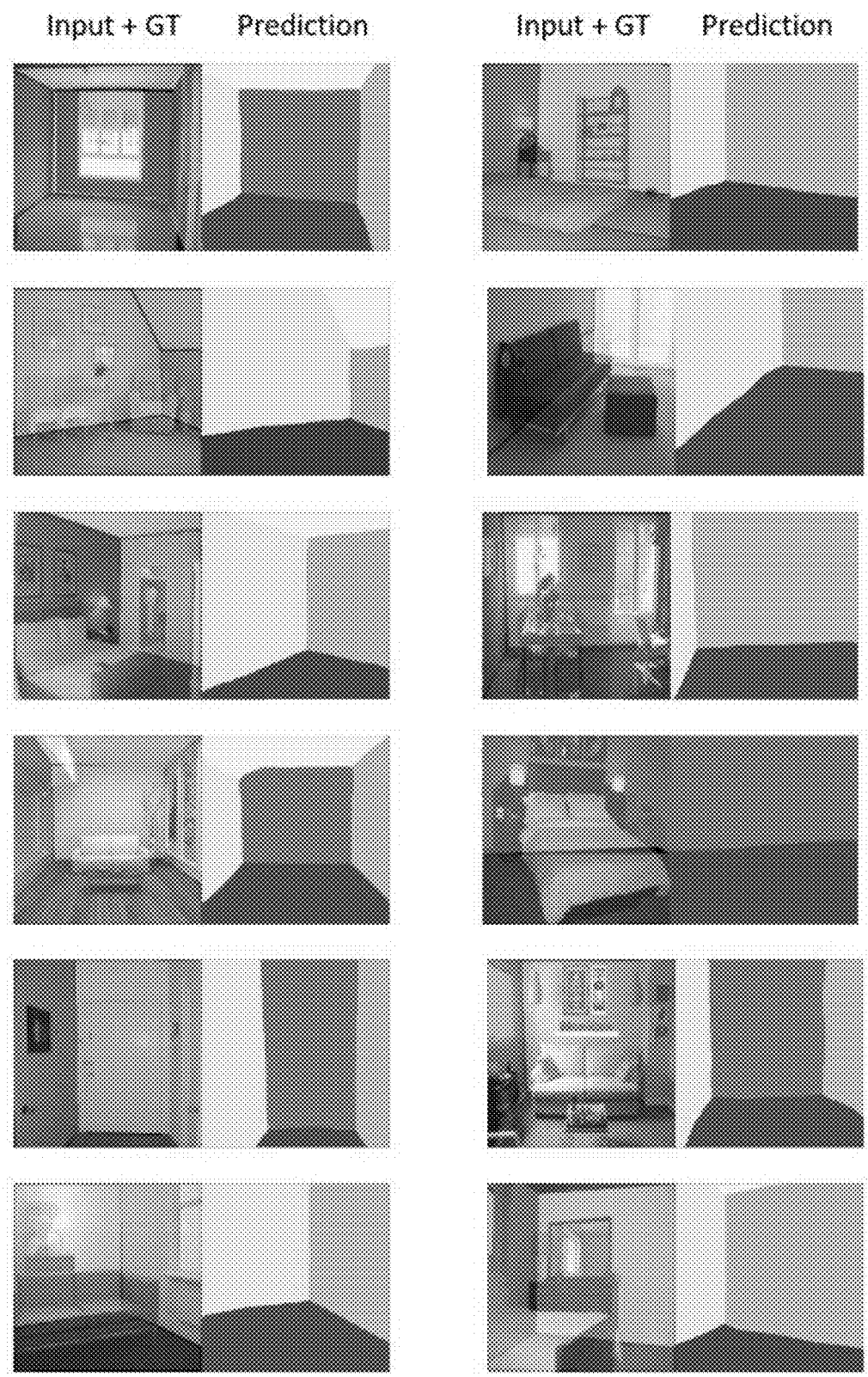
FIG. 13 is a schematic diagram of the visualization results of layout estimation in Hedau testing set in the present disclosure.

From the performance in and visualization results, the model may be applied to different indoor datasets even without re-training. The visual results in FIG. 13 depict some samples of the high-quality layout estimation results in Hedau testing dataset. Also, the entry in Table 3 shows that the accuracy of our model may almost achieve the state-of-the-art result.

Figure 14:
FIG. 14 is a schematic diagram of the visualization outputs of our model on the randomly collected images from Google in the present disclosure.

The model is evaluated on the randomly selected images from the search engine from Google image, and the results in FIG. 14.

Though the result does not perform the best accuracy for the 2D layout estimation metrics in datasets, the advantage of the model is its computational efficiency since it is an end-to-end system without any optimization process or recurrent structure.

TABLE 4

The time efficiency of each method in forwarding time and post-processing time.

| Method | Forward (sec) | Post-process (sec) | FPS |
| --- | --- | --- | --- |
| DeLay (2016) | 0.125 | about 30 | 0.01 |
| CFILE (2016) | 0.060 | not reported | — |
| RoomNet (2017) recurrent 3-tier | 0.168 | — | 5.96 |
| Zhang (2017) et al. | not reported | about 180 | — |
| ST-PIO (2017) | 0.067 | about 10 | 0.01 |
| LayoutNet (2018) | 0.039 | 0 | 25.64 |
| DeepRoom 2D single task | 0.023 | 0 | 43.47 |
| DeepRoom 2D multi-task | 0.027 | 0 | 36.95 |
| DeepRoom 2D/3D end-to-end | 0.032 | 0 | 31.25 |

The approach is implemented with PyTorch and all the experiments are performed on the machine with single NVIDIA GeForce 1080 GPU and Intel i7-7700K 4.20 GHz CPU. For the analysis of time efficiency, the Table 4 shows the consuming time for both network forwarding and post-processing time of exited methods. Hence, fully released implementations of these papers may not be found. The listed entries in the column of the post-processing come from the official papers and cited ones, or the information from their released demo video. For the time consuming in network forwarding column, several methods released the network configuration file for Caffe. Thus, the time may be measured with official Caffe profiling tool and evaluated on the machine under a fair competition.

The proposed model is also integrated into a demo system, which may make the realtime estimation on many kinds of inputs, (a) the video captured from the web camera and mobile phones, (b) the collected folders of images, and (c) the real-time captures of hand-held web camera.

The indoor scene structural estimation system and estimation method thereof based on deep learning network in the present disclosure propose an end-to-end framework composed of two explainable networks for decoupling the 3D layout estimation task into two sub-tasks. They may also be jointly used to estimate the 3D cuboid representation of the spatial layout for the indoor scene. This has been so far the first work that models the layout estimation as a two-stage deep learning forwarding pipeline instead of the conventional systems with an additional post-processing or optimization step. Furthermore, the combination of the two networks relies on the intermediate representation, which makes the framework pipeline open to the extensibility with using extra datasets for training and fine-tuning to achieve better outcomes. Due to the high computational efficiency of the system, the capability of the proposed system is also illustrated for the real-time demonstration. Thus, the proposed system may be applied and extended to the real-time applications such as the indoor navigation, localization, and the virtual object arrangement in the rooms.

As stated, for the indoor scene structural estimation system and the method thereof based on deep learning network in the present disclosure, the scene structural layout and the 3D parameter may be obtained through the two-phase estimations to achieve the purpose of outputting the 3D indoor scene image. Specifically, the indoor scene structural estimation system and the method thereof based on deep learning network in the present disclosure do not require any additional processes or optimization. Still, the 3D indoor scene image may directly be outputted, meaning a decrease in the amount to be operated and an increase in the efficiency of the operation.

The embodiments as described above are only explanations of the technical ideas and features of the present disclosure. The purpose is to enable those skilled in the art to understand the contents in the present disclosure and put the contents into practice. It is apparent that the claims of the present disclosure cannot be confined by the contents. That is, the scopes of the equivalent changes or modifications made by the spirit disclosed by the present disclosure should still be included in the claims of the present disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35

U.S.C. § 112(f) unless an element is expressly recited using the phrase "means for," or in the case of a method claim using the phrases "operation for" or "step for."

What is claimed is:

1. An indoor scene structural estimation system based on deep learning network, comprising:
   a 2D encoder receiving an input image and encoding the input image;
   a 2D plane decoder connected to the 2D encoder, decoding the encoded input image, and generating a 2D plane segment layout image by using a loss function for network training, and the loss function is presented as follows:

$$Loss = \mathcal{L}_{plane} + \mathcal{L}_{edge} + \mathcal{L}_{corner}$$

$$L_{plane} = \mathcal{L}_{seg} + \lambda_s \mathcal{L}_{smooth}$$

$$\mathcal{L}_{smooth} = mean(|x_i - target_i|_1),$$

wherein Loss is the loss function, $L_{place}$ is a plane loss function, $L_{edge}$ is an edge loss function, $L_{corner}$ is a corner loss function, $L_{seg}$ is a segment loss function, $L_{smooth}$ is a smooth loss function, $\lambda_s$ is the weight for smoothness term, $x_i$ is the predicted output, and $target_i$ is the ground truth label,
   a 2D edge decoder connected to the 2D encoder, decoding the encoded input image and generating a 2D edge layout image, and trained by using the loss function;
   a 2D corner decoder connected to 2D encoder, decoding the encoded input image and generating a 2D corner layout image, and trained by using the loss function; and
   a 3D encoder connected to the 2D plane decoder, the 2D edge decoder, and the 2D corner decoder, receiving the 2D plane segment layout image, the 2D edge layout image, and the 2D corner layout image, encoding the 2D plane segment layout image, the 2D edge layout image, and the 2D corner layout image to generate a 3D parameter, and generating a 3D indoor scene image according to the 3D parameter.

2. The indoor scene structural estimation system based on deep learning network according to claim 1, wherein the 3D encoder has a first training phase and a second training phase and comprises a random abstraction layer generator generating a virtual 3D parameter and a template cube in the first training phase; the template cube is inputted to the 2D encoder for encoding; the 2D edge decoder decodes the encoded template cube to generate the 2D edge layout image; a pre-trained 3D encoder encodes the 2D edge layout image to generate a training 3D parameter; when the training 3D parameter and the virtual 3D parameter are identical, the first training phase ends; in the second training phase, an actual training image is inputted to the 2D encoder, and the 2D edge decoder decodes the encoded actual training image to generate the 2D edge layout image; the 2D edge layout image is inputted to the pre-trained 3D encoder and encoded to generate the training 3D parameter, and the 2D edge layout image is inputted to a target 3D encoder and encoded to generate a target 3D parameter; when the error of the target 3D parameter and the training 3D parameter is less than a preset threshold value, the second training phase ends and the target 3D encoder acts as the 3D encoder.

3. The indoor scene structural estimation system based on deep learning network according to claim 1, wherein the input picture is provided by a camera, the camera has a camera intrinsic matrix, and a projected image of the 3D indoor scene image conforms to the following equation generated based on the camera intrinsic matrix:

$$X_{2D} \equiv \pi(X_{3D} \mid K, P, scale)$$

$$K = \begin{bmatrix} f_x & 0 & c_x \\ 0 & f_y & c_y \\ 0 & 0 & 1 \end{bmatrix}$$

$$P = [R \mid T] \in \mathbb{R}^{3 \times 4}$$

wherein, $X_{2D}$ is a projected image, $\pi$ refers to projection, $X_{3D}$ is a 3D indoor scene image, K is the camera intrinsic matrix of the camera, scale is a side-length ratio of a cube formed by an indoor scene where the camera is located, $f_x$ and $f_y$ are focal length coordinates of the camera, $c_x$ and $c_y$ are central point coordinates of the camera, R is a 3×3 rotation matrix, T is a 3×1 translation vector, and P is a projection matrix.

4. The indoor scene structural estimation system based on deep learning network according claim 1, wherein the 3D parameter comprises a triaxial Euler rotation angle, a triaxial length ratio of the cube corresponding to the 3D indoor scene image, and the camera location of a camera outputting the output image.

5. An indoor scene structural estimation method based on deep learning network, applicable to a system comprising a 2D encoder, a 2D plane decoder, a 2D edge decoder, a 2D corner decoder, and a 3D encoder, the indoor scene structural estimation method based on deep learning network comprising steps of:
   receiving an input image and encodes the input image;
   decoding the encoded input image and generating a 2D plane segment layout image, a 2D edge layout image, and a 2D corner layout image by using a loss function for network training, and the loss function is presented as follows:

$$Loss = \mathcal{L}_{plane} + \mathcal{L}_{edge} + \mathcal{L}_{corner}$$

$$L_{plane} = \mathcal{L}_{seg} + \lambda_s \mathcal{L}_{smooth}$$

$$\mathcal{L}_{smooth} = mean(|x_i - target_i|_1),$$

wherein Loss is a loss function $L_{place}$ is a plane loss function $L_{edge}$ is an edge loss function, $L_{corner}$ is a corner loss function, $L_{seg}$ is a segment loss function, $L_{smooth}$ is a smooth loss function, $\lambda_s$ is the weight for smoothness term, $x_i$ is the predicted output, and $target_i$ is the ground truth label;
   encoding the 2D plane segment layout image, the 2D edge layout image, and the 2D corner layout image to generate a 3D parameter; and
   generating a 3D indoor scene image according to the 3D parameter.

6. The indoor scene structural estimation method based on deep learning network according to claim 5, wherein the 3D encoder comprises a first training phase and a second training phase, and the indoor scene structural estimation method based on deep learning network further comprises the following steps:
   generating a virtual 3D parameter and a template cube in the first training phase;
   encoding the template cube by the 2D encoder;
   decoding the encoded template cube to generate the 2D edge layout image;

encoding the 2D edge layout image by a pre-trained 3D encoder to generate a training 3D parameter and ending the first training phase when the training 3D parameter and the virtual 3D parameter are identical;

inputting an actual training image to the 2D encoder in the second training phase;

decoding the encoded actual training image by the 2D edge decoder to generate the 2D edge layout image;

encoding the 2D edge layout image by the pre-trained 3D encoder to generate the training 3D parameter; and encoding the 2D edge layout image by a target 3D parameter to generate a target 3D parameter, ending the second training phase when the error of the target 3D parameter and the training 3D parameter is less than a preset threshold value, and the target 3D encoder acting as the 3D encoder.

7. The indoor scene structural estimation method based on deep learning network according to claim 5, wherein the input picture is provided by a camera, the camera has a camera intrinsic matrix, and a projected image of the 3D indoor scene image conforms to the following equation generated based on the camera intrinsic matrix:

$$X_{2D} \equiv \pi(X_{3D} \mid K, P, \text{scale})$$

$$K = \begin{bmatrix} f_x & 0 & c_x \\ 0 & f_y & c_y \\ 0 & 0 & 1 \end{bmatrix}$$

$$P = [R \mid T] \in \mathbb{R}^{3\times 4}$$

wherein, $X_{2D}$ is a projected image, $\pi$ refers to projection, $X_{3D}$ is a 3D indoor scene image, K is the camera intrinsic matrix of the camera, scale is a side-length ratio of a cube formed by an indoor scene where the camera is located, $f_x$ and $f_y$ are focal length coordinates of the camera, $c_x$ and $c_y$ are central point coordinates of the camera, R is a 3×3 rotation matrix, T is a 3×1 translation vector, and P is a projection matrix.

8. The indoor scene structural estimation method based on deep learning network according claim 5, wherein the 3D parameter comprises a triaxial Euler rotation angle, a triaxial length ratio of the cube corresponding to the 3D indoor scene image, and the camera location of a camera outputting the output image.

* * * * *